(12) United States Patent
Smaal

(10) Patent No.: US 9,861,082 B2
(45) Date of Patent: Jan. 9, 2018

(54) INJECTION SYSTEM AND METHOD OF MONITORING INJECTION

(71) Applicant: Viscon B.V., s-Gravendeel (NL)

(72) Inventor: Bastiaan Arie Smaal, s-Gravendeel (NL)

(73) Assignee: Viscon B.V., S'-Gravendeel (NL)

(*) Notice: Subject to any disclaimer, the term of this patent is extended or adjusted under 35 U.S.C. 154(b) by 0 days.

(21) Appl. No.: 15/509,388

(22) PCT Filed: Aug. 3, 2015

(86) PCT No.: PCT/NL2015/050563
§ 371 (c)(1),
(2) Date: Mar. 7, 2017

(87) PCT Pub. No.: WO2016/039621
PCT Pub. Date: Mar. 17, 2016

(65) Prior Publication Data
US 2017/0258054 A1    Sep. 14, 2017

(30) Foreign Application Priority Data
Sep. 8, 2014  (NL) .................................... 2013433

(51) Int. Cl.
*A01K 45/00*     (2006.01)
*A01K 43/00*     (2006.01)

(52) U.S. Cl.
CPC ............ *A01K 45/007* (2013.01); *A01K 43/00* (2013.01)

(58) Field of Classification Search
CPC ............................. A01K 45/007; A01K 43/00

USPC .......................................................... 119/6.8
See application file for complete search history.

(56) References Cited

U.S. PATENT DOCUMENTS

| 4,469,047 | A | * | 9/1984 | Miller | ................. | A01K 45/007 119/6.8 |
| 4,593,646 | A | * | 6/1986 | Miller | ................. | A01K 45/007 119/6.8 |
| 5,056,464 | A | * | 10/1991 | Lewis | ................. | A01K 45/007 119/6.8 |
| 6,240,877 | B1 | * | 6/2001 | Bounds | ............... | A01K 45/007 119/6.8 |

(Continued)

FOREIGN PATENT DOCUMENTS

| EP | 1304030 | 4/2003 |
| WO | WO-0040079 | 7/2000 |

*Primary Examiner* — Yvonne Abbott-Lewis
(74) *Attorney, Agent, or Firm* — Marcus C. Dawes; Daniel L. Dawes

(57) ABSTRACT

The present disclosure relates to a system configured to inject objects, such as eggs, with a fluid, wherein said objects each comprise at least two object parts, such as embryo tissue, embryotic or allantoic fluid and an air pocket, of which at least one object part is to be injected, by advancing injection needles to a determined depth, which depth is expected to correspond with the at least one object part to be injected, into the objects and injecting fluid into the objects at the determined injection depth. The system a sensor to monitor pressure or flow of the fluid during injecting, and to generate a monitoring signal, the control being configured to detect an operational state of the needles and/or the fluid, indicating proper operation or defect in the system, such as a blocked fluid line and/or needle, based on the monitoring signal representing the monitored pressure or flow.

12 Claims, 4 Drawing Sheets

(56) References Cited

U.S. PATENT DOCUMENTS

Figure 1:
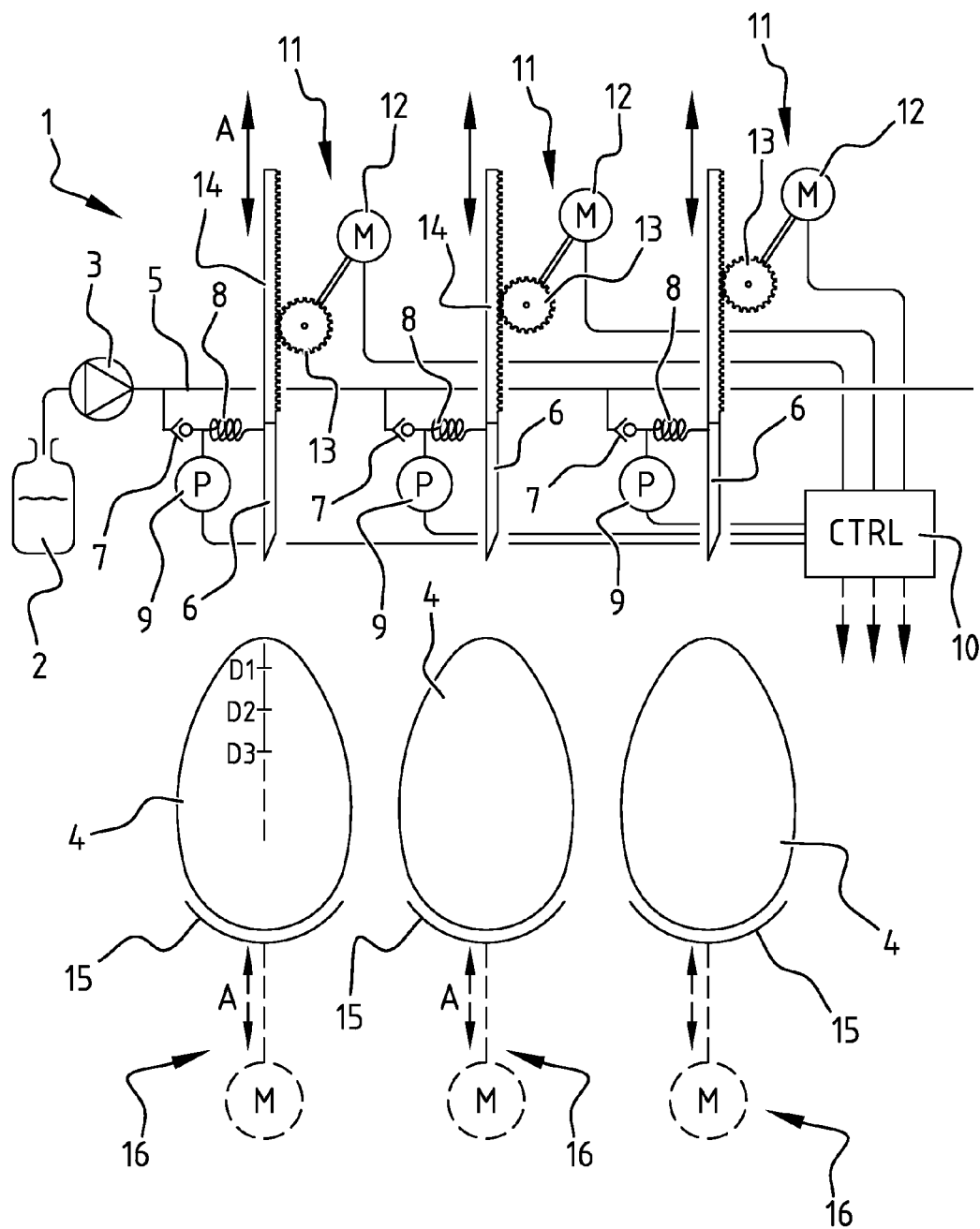

| | | | | |
|---|---|---|---|---|
| 6,286,455 B1 * | 9/2001 | Williams | ............ | A01K 45/007 |
| | | | | 119/6.8 |
| 7,165,507 B2 | 1/2007 | Wolfe | | |
| 7,430,987 B2 * | 10/2008 | Smith | .................. | A01K 45/007 |
| | | | | 119/6.8 |
| 7,721,674 B2 * | 5/2010 | Smith | .................... | A61D 1/025 |
| | | | | 119/6.8 |
| 2004/0144324 A1 * | 7/2004 | Gross | .................. | A01K 45/007 |
| | | | | 119/6.8 |
| 2004/0163602 A1 * | 8/2004 | Correa | ................ | A01K 45/007 |
| | | | | 119/6.8 |

* cited by examiner

INJECTION SYSTEM AND METHOD OF MONITORING INJECTION

The present disclosure relates to a method of monitoring injection and a system of injecting fluid into or withdrawing fluid from a plurality of objects, such as eggs.

Reference is made here to U.S. Pat. No. 7,165,507, which teaches individual drive of a plurality of injection needles for injection of a plurality of eggs. According to this disclosure, pressure in or flow of fluid to flow through each needle is measured continuously as the needles move into the individual eggs. The needles are individually driven into individual eggs. Depending on a change in the measured pressure or flow, assuming that a desired location in or portion of the egg is reached, the position of which location or portion is beforehand not exactly known, the movement is stopped to perform injection or extraction. Thereby the individual movement of each of the plurality of needles for injecting fluid into or withdrawing fluid is halted to continue the injection into or extraction from the singular egg, depending on the functional state thereof, i.e. the penetration depth.

This prior art teaching has several disadvantages. As an exemplary disadvantage, each needle must be equipped with an individual drive and control over the drive, wherein the drive and the control need to be responsive to measurements of pressure and/or flow in order to stop an advance of a needle in a particular egg at a desired location, i.e. in correspondence with a functional state related to the purpose of injecting. As a consequence, the prior art system and method are costly, complex, and prone to malfunction. In particular, such a known system and method is likely to decide that the needle has advanced into an denser fluid or tissue, when the pressure increases and/or flow reduces. However, such an occurrence can be due to blockage of any particular needle, and in such a case an erroneous consequential action can be decided on, assumed to be based on a detected functional state, whereas the cause of the detected pressure or flow variation is actually an operational defect.

Additionally reference is made here to EP-1304030 and WO-2000/40079, which relate respectively to injecting eggs and to detection of a functional state in relation to advancement depth of needles into objects and more in particular into an object part to be injected.

Embodiments of the present disclosure aim at reducing or even obviating disadvantages of the prior art method and system. To this end a method is provided of monitoring injection of objects, such as eggs, with a fluid, wherein said objects each comprise at least two object parts, such embryo tissue, embryotic or allantoic fluid and an air pocket, of which at least one object part is to be injected, the method comprising: advancing injection needles to a determined depth, which depth is expected to correspond with the at least one object part to be injected, into the objects and injecting fluid into the objects at the determined injection depth; monitoring pressure or flow of the fluid at least during injecting; and detecting an operational state of the needle and/or the fluid based on the monitored pressure or flow. Therein the operational state indicating proper operational performance of a defect or even a malfunction, is distinct from the functional state of detecting a desired advancement of the injection needle into an object part, injection of which is to be achieved, to which the above referenced prior art publication relates. Further, an injection system is provided, which is configured to inject objects, such as eggs, with a fluid, wherein said objects each comprise at least two object parts, such embryo tissue, embryotic or allantoic fluid and an air pocket, of which at least one object part is to be injected, the system comprising: a supply configured to provide a group of at least one object; needles connected with at least one drive configured for selective movement of the objects and the needles relative to one another, a control configured to inject needles into the objects to a determined injection depth for injection of the objects, which depth is set to correspond with the at least one object part to be injected, and to advance the injection needles to the determined depth into the objects and injecting fluid into the objects at the determined injection depth; at least one sensor configured to monitor pressure or flow of the fluid at least during injecting, and to generate a monitoring signal sent to the control; and wherein the control is further configured to detect an operational state of the needles and/or the fluid based on the monitoring signal representing the monitored pressure or flow. It is noted that the method and system of the present disclosure entirely break with the prior art individual object based approach, based on assumed detection of a functional state as opposed to an operational state, to allow detection of air bubbles in fluid and/or partial or full blockage of needles and/or fluid lines. The benefits with respect to detection of defect or even malfunction of the system are considered to outweigh any spurious misinjections, for example in another object part than intended, over the numerous insufficiently injected objects, which could occur in the prior art methods and systems, when needles are partially or fully blocked and the erroneous conclusion is drawn that injection has taken place in a desired object part.

The present disclosure comprises a number of preferred embodiments, some of which are represented in the below description under reference to the appended drawings, and/or defined in appended dependent claims.

For instance, the method may—in a specific embodiment—comprise that detecting the operational state of the needle and/or of the fluid comprises comparing a monitored pressure or flow with an operational reference. The control may be configured to detect the operational state of the needles and/or of the fluid by comparing a monitored pressure or flow with an operational reference. In such an embodiment the method may be such, that the operational reference comprises an expected pressure or flow change in time during and/or after injecting the objects, based on desired working conditions of the needle and/or connections thereto and in the fluid. In relation to the system it is noted that the operational reference may comprise an expected pressure or flow change in time during and/or after injecting the objects, based on desired working conditions of the needle and/or connections thereto and in the fluid.

In an alternative or additional embodiment, the method may be such that monitoring is maintained during a period after injecting the fluid. For the corresponding system, at least one of the sensor and the control is configured to continue monitoring during a period after injecting the fluid.

In an alternative or additional embodiment, the method may be such that determining the injection depth, which is expected to correspond with the at least one object part to be injected, comprises: providing a test group of at least one object; stepwise advancing an injection needle to at least two different depths in and injecting fluid at each of the two different depths into each of the at least one object of the test group; selecting one of the at least two different depths as the determined injection depth at which the object part to be injected is arranged in the at least one object of the test group based on an injection pressure or injection flow relative to an expected injection pressure of injection flow at injection of the fluid at each of the at least two different depths; and injecting all of a plurality of objects other than the objects in the test group to the determined injection depth of the object part to be injected of the at least one object of the test group. In such an embodiment the method may be such that the expected injection pressure or injection flow comprises an object part reference of an expected pressure or flow change in time during and/or after injecting the objects, based on injecting the fluid in distinct ones of the object parts of the objects.

Correspondingly, the system may additionally or alternatively exhibit the features, that the injection depth, which is set to correspond with the at least one object part to be injected, is set through: the control being configured to advance needles into objects of a test group using the drive and to stepwise advance the injection needles to at least two different depths in and injecting fluid at each of the two different depths into each of the at least one object of the test group; wherein the control is further configured to select one of the at least two different injection depths as the determined injection depth at which the object part to be injected is arranged in the at least one object of the test group from a injection pressure or injection flow relative to an expected injection pressure of injection flow at injection of the fluid at each of the at least two different depths; and wherein the needles and drives are connected with the control and are together with the control configured to inject all of a plurality of objects other than the objects in the test group to the determined injection depth of the object part to be injected of the at least one object of the test group. In such an embodiment, the system may exhibit the further feature that the expected injection pressure or injection flow comprises an object part reference of an expected pressure or flow change in time during and/or after injecting the objects, based on injecting the fluid in distinct ones of the object parts of the objects. Especially if a highly accurately determined expected or desired injection depth is available, which is also a dependent subject of the present disclosure, the risk of erroneous injection in another object part than a desired object part can effectively be prevented from occurring.

With the method and injection system exhibiting these assemblies of features, disadvantages of prior art methods and systems can be reduced, if not overcome. In fact, the embodiments of the present disclosure rely on obtaining predetermined injection depth information from a test group of objects, in particular eggs, in a so-called calibration step, to thereafter inject needles into the subsequent larger populations of objects, eggs, all to the same injection depth, without individual measurement and the like. Once the calibration is performed, based on the test group, all of the objects that need to be injected are injected simultaneously, possibly in groups of simultaneously injected objects, and possibly using test groups repeatedly and/or intermittently, and to the same depth. This approach based on identical treatment with respect to injection depths of all of the objects to be injected after the test group, is completely opposite and consequently novel and inventive, relative to the prior art method and system that are entirely dedicated to individual injection and measurement. It is acknowledged here that the approach to injection according to the present disclosure may result in sporadic mis-injection, for example if in an individual egg the embryo is at an entirely different location than all the embryos of the eggs in the test group, which is however entirely and more than compensated for by the fact that the embodiments of the present disclosure allow detection of blockage in individual needles in every degree, as well as the presence of air bubbles in injection fluid, and the like. Tests have surprisingly shown that the common approach to the task of injection into great numbers of individual objects with the ability to detect any degree of blockage and the presence of air bubbles far outweighs any capability according to the prior art of individual injection per separate object to a injection depth, that is beforehand not known.

In a specific embodiment of the present disclosure related to a method, the test group comprises two or more objects, and the step of determining the injection depth comprises determining the injection depth for most certain injection of the fluid into the object part to be injected for each or most of the two or more objects in the test group. In a specific embodiment of the present disclosure related to a system, the test group comprises two or more objects, and the control is configured to determine the injection depth by determining the injection depth for most certain injection of the fluid into the object part to be injected for each or most of the two or more objects in the test group. By increasing the test group and the number of objects therein, a higher degree of accuracy can be attained. For each of the objects in the test group, a necessary injection depth can be determined, for instance stepwise, by advancing an injection needle per object in the test group over a predetermined distance into the object, stopping advance of the needle, and performing a test injection or extraction at the reached injection depth. Depending on the instantaneous pressure or flow—and therefore not on the basis of any continuous change in any one or more than one of these parameters of pressure and/or flow—embodiments of the method and/or system can decide on the nature of the object part, into which the injection needle at the reached injection depth extends.

In a specific embodiment of the present disclosure related to a method, the step of determining the injection depth comprises distinguishing between injecting fluid into air, into fluid and into tissue based on the object part reference, and setting a depth at a one of the at least two different injection depths, at which the injection pressure or injection flow most closely approximates the object part reference corresponding with the object part to be injected, as the determined injection depth. In a specific embodiment of the present disclosure related to a system, the control is configured to determine the injection depth by distinguishing between injecting fluid into air, into fluid and into tissue based on the object part reference, and setting a depth at a one of the at least two different injection depths, at which the injection pressure or injection flow most closely approximates the object part reference corresponding with the object part to be injected, as the determined injection depth. Thus the secure manner of distinguishing is provided between injection into the air pocket, a fluid in the egg or into the embryo.

A specific embodiment of the present disclosure related to a method, further comprises: monitoring the injection pressure or injection flow for each individual injection needle during injection of fluid simultaneously in a plurality of objects. In a specific embodiment of the present disclosure related to a system further comprising a plurality of pressure or flow sensors, wherein the control is configured to monitor the injection pressure or injection flow for each individual injection needle during injection of fluid simultaneously in a plurality of objects. These features relate to the situation after having set or determined a preferred or necessary injection depth, after which all of the objects or eggs to be injected will be injected to the same injection depth. In such an embodiment, the method may further comprise: deciding that an injection needle is at least partially blocked, if at or after injection of fluid into the objects, the injection pressure or flow drops slower than the expected for the object part to be injected. The method may further comprise at least one of replacing, unblocking or cleaning the injection needle, when a difference between a monitored pressure or flow drop and an expected pressure or flow drop or between a monitored pressure or flow drop and the operational reference corresponding with the object part to be injected exceeds a predetermined threshold. The system may further indicate at least one of replacing, unblocking or cleaning the injection needle, when a difference between a monitored pressure or flow drop and an expected pressure or flow drop or between a monitored pressure or flow drop and the operational reference corresponding with the object part to be injected exceeds a predetermined threshold. The control may further be configured to decide that an injection needle is at least partially blocked, if at or after injection of fluid into each of the plurality of objects other than the objects in the test group the injection pressure or flow drops slower than the reference corresponding with the object part to be injected, and optionally at least one of replacing, unblocking or cleaning the injection needle, when a difference between a monitored pressure or flow drop and the reference corresponding with the object part to be injected exceeds a predetermined threshold. In such an embodiment of the present invention it is even possible to continue to apply a partially blocked needle, for instance if the degree of blockage is sufficient to ensure that adequate amounts of fluid are injected or extracted. In yet a further refined form of this embodiment the method further comprises: administering an additional fluid injection and monitoring the injection pressure or injection flow for an injection needle suspected of blockage, before deciding that the injection needle is blocked, if again thereafter injection pressure or flow drops slower than an expectation or the operational reference corresponding with the object part to be injected. With respect to the system the control may be further configured to administer an additional fluid injection and monitor the injection pressure or injection flow for an injection needle suspected of blockage, before deciding that the injection needle is blocked, if again thereafter injection pressure or flow drops slower than an expectation or the operational reference corresponding with the object part to be injected.

In an embodiment at least based on monitoring, the method may further comprise: deciding that an object is absent, if at injection of fluid into the objects, the injection pressure or flow reduces more quickly than an expectation or the operational reference corresponding with the object part to be injected.

In an embodiment at least based on monitoring, the method may further comprise: deciding on air bubble presence in the injection fluid, if at injection of fluid into the objects, the injection pressure or flow reaches a lower maximum than expected or than the operational reference corresponding with the object part to be injected.

In an embodiment of the system, the controller may be configured to decide: that an object is absent, if at injection of fluid into the objects, the injection pressure or flow reduces more quickly than an expectation or operational reference corresponding with the object part to be injected, and/or on air bubble presence in the injection fluid, if at injection of fluid into the objects, the injection pressure or flow reaches a lower maximum than expected or than the operational reference corresponding with the object part to be injected.

Figure 2:
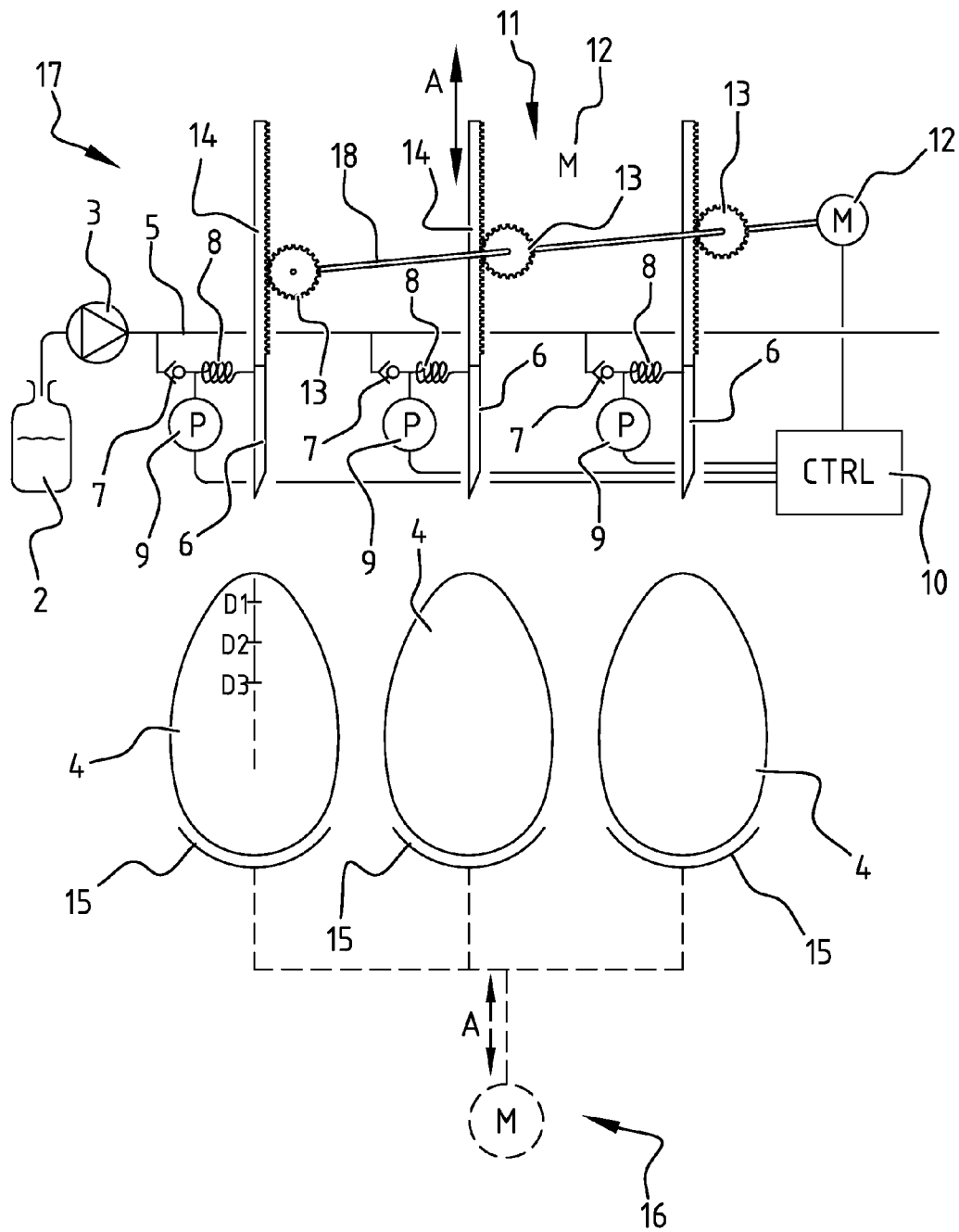
Figure 5:
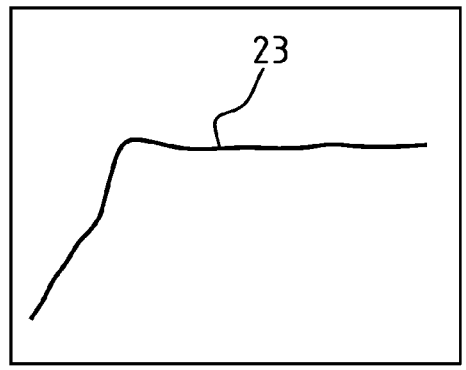
Figure 6:
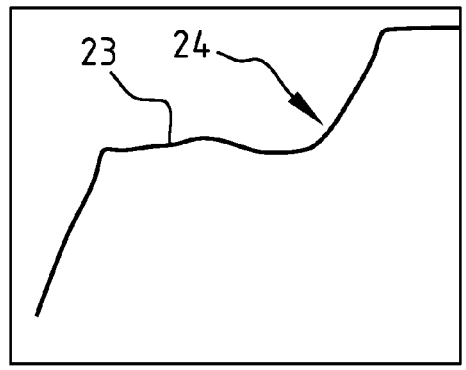
Figure 7:
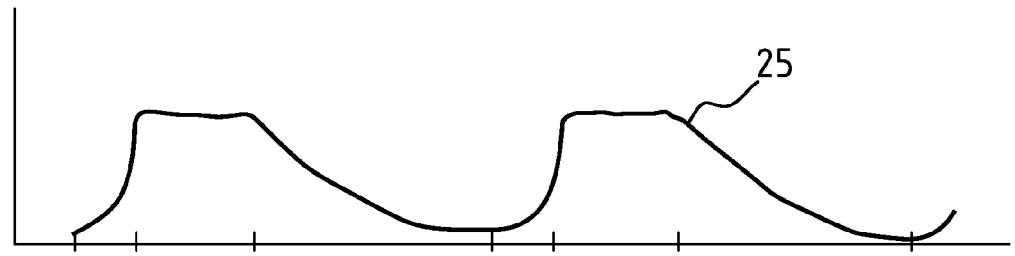
Figure 8:
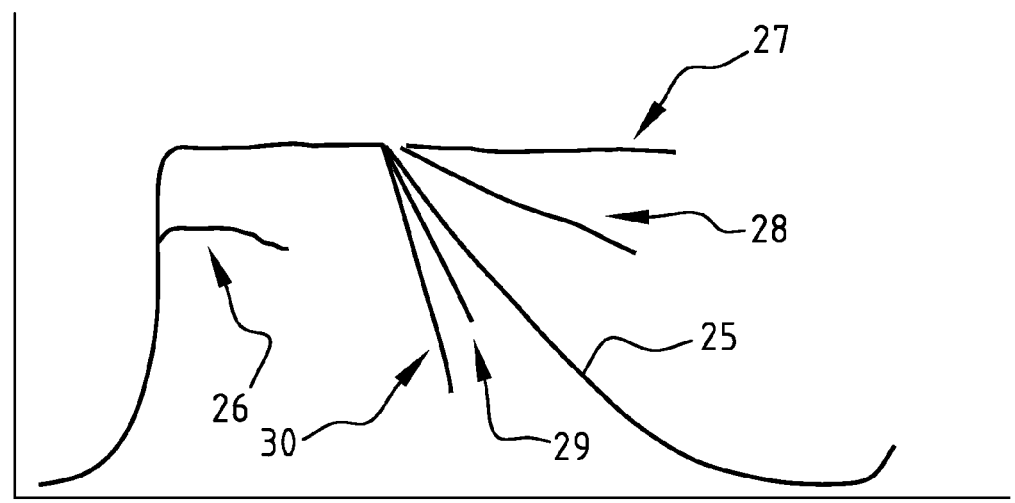

Herein below, specific embodiments are described, referring to the appended drawing, in which the same or similar reference numbers can be employed for the same or similar elements, components and/or aspects. The embodiments in the appended drawing are by no means to be interpreted as limiting on the scope of protection for embodiments of the present disclosure, as defined in the appended claims. In the appended drawing:

FIG. 1 exhibits a first embodiment of a system according to the present disclosure, in which simultaneously the method according to the present disclosure is embodied;

FIG. 2 exhibits a second embodiment of a system according to the present disclosure, in which simultaneously the method according to the present disclosure is embodied;

FIGS. 3-6 exhibit changes in time of pressure in a fluid injected into an object, wherein specific detectable circumstances play a role; and FIGS. 7 and 8 exhibit a curve of pressure over time to clarify detection of specific circumstances.

FIG. 1 shows a system 1 according to the present disclosure, wherein the fluid supply 2 in the form of for example a vessel is provided in conjunction with a pump 3. In the exhibited embodiment, the exemplary field of application is injection of eggs.

When referring in the present disclosure to injection, reference is made to injection of the needle, regardless of an intended purpose of injecting fluid into or extracting fluid out of the objects and the eggs more in particular. The fluid supply 2 can be a receptacle to receive fluids extracted from individual eggs 4.

A fluid line 5 is connected to pump 3, and branches out into to individual needles 6 via non-return valves 7 and flexible line parts 8. Between the non-return valves 7 and the flexible line parts 8, pressure sensors 9 are provided. Pressure sensors 9 are connected with the control 10 to provide pressure measurement results to the control 10. Pressure sensors nine can be replaced by flow sensors (not shown).

Each of the needles 6 is, in the embodiment of FIG. 1, provided with an individual drive 11, comprising a motor 12 and a toothed wheel 13 acting on a rack 14, to control movement of each of the needles 6 in the direction of double arrow A. Alternatively, eggs 4 can be arranged on supports 15, to move up or down there with, to and from needles 6, using alternative or additional drives 16. Motors 12 or drives 16 will be driven by control 10. Alternatively, as shown in FIG. 2, the individual motors 12 can be replaced by a common motor 12 in an alternative embodiment of the system 17. The common motor 12 in the embodiment of FIG. 2 can be connected with the toothed wheels 13 via an axis 18. Likewise, individual drives 16 can be replaced by a single or common drive 16 in the embodiment of FIG. 2, to raise or lower supports 15 under eggs 4 synchronously. The embodiment according to FIG. 1 may have a slight preference over the embodiment of FIG. 2, as any injection needle 6 can be restrained from reaching a deeper injection depth than necessary, also for the eggs 4 in the test group, in particular if the same configuration is employed both for calibration and for subsequent injections. In the embodiment according to FIG. 2, all injection needles 6 will be driven during calibration to a predetermined number of penetration depths, regardless of whether or not already an embryo was encountered at a lower injection depth. On the other hand, the configuration according to FIG. 2 allows for the same system to be used, during the calibration step and subsequent injection steps for injecting high numbers of eggs simultaneously or in sequence. However, the system according to FIG. 1 can also be employed both during calibration and subsequent injection of large numbers of eggs other than the eggs 4 in the test group, simply by driving the motors 12 in synchronicity.

In a test or calibration phase, control 10 will drive motors 12 or drives 16 in such a way, that the needles 6 advance into eggs 4 in a stepwise manner to a first depth at D1, a second depth at D2, a third step at D3, etc. At reaching each of the predetermined depths, relative movement of the eggs 4 in relation to needles 6 is paused for a test injection or extraction. Based on values measured with sensors 9, it is determined for each of the eggs for at each of the depths D1, D2, . . . , what matter was encountered; air pocket, fluid, or embryo. Based on a non-limiting assumption that injection into embryos is desired, and of the test population of eggs 4 in the test or calibration phase, the highest probability of encountering an embryo is determined at injection depth D2 from the depths of D1, D2, . . . , the decision can be taken to thereafter inject all eggs other than the eggs 4 of the test group to this determined injection depth D2 and achieve the highest degree of certainty that embryos will be injected as a consequence. As a consequence, the prior art concept of individual injection to a beforehand unknown injection depth is relinquished, in favour of an algorithm or method where large numbers of eggs other then the eggs 4 of the test group will all be injected to the same injection depth, which will there before have been determined on the basis of results of measurements with respect to the eggs 4 in the test group. Alternatively, any other method to determine a desired or necessary injection depth having the highest possible degree of certainty about injection into a desired object part, may be employed to replace the described calibration. Further, the calibration as set out herein may be employed in combination with or for other purposes than subsequent injections, and may even form subject of an independent invention, even without any detection of an operational state of the system or any part or component thereof, or of the fluid.

Figure 3:
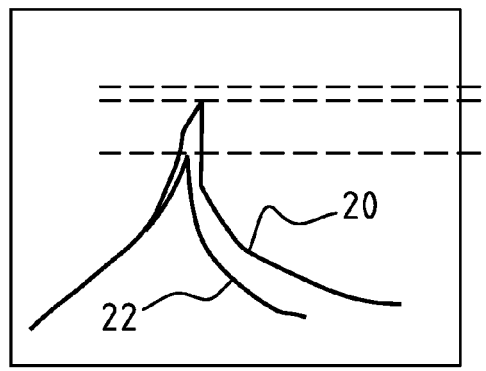
Figure 4:
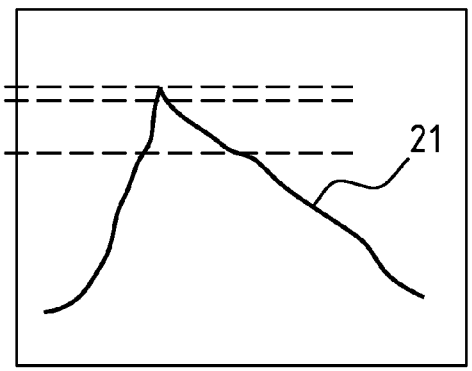

FIG. 3 exhibits a characteristic curve for injection into fluid, whereas FIG. 4 exhibits a similar characteristic curve for injection into tissue, for instance of an embryo. The characteristic curves referred to here exhibit pressure over time, wherein pressure can be measured using the pressure sensors 9 in FIG. 1 or 2. Similar or the same considerations would ensue, if pressure sensors 9 were replaced by flow sensors.

The maximum pressure value for injection into fluid 20 is only slightly less than a maximum pressure value for injection into tissue 21, which is self evident from or comparison of FIGS. 3 and 4. Further, the curve for injection into fluid 20 falls away more sharply, after pressure from pump 3 is released, then the curve for injection into tissue 21. Consequently, from detection results at any given injection depth, without even movement of the injection needle relative to the object to be injected, it is possible to draw a conclusion about a location at which injection is taking place, and more in particular about an object part into which injection is taking place, for example in the test or calibration phase. It should be noted that for each of the curves in FIGS. 3-8, the pump is deactivated at reaching a maximum pressure value or configured to maintain the maximum pressure value for a predetermined period of time, before deactivation. Conclusions about tissue or fluid, blockages of lines and/or needles, and about air bubbles in fluids to be injected can be drawn on the basis of measurements and curves, as will be explained herein below, in particular with respect to pressure build up and/or pressure release.

In FIG. 3 an additional curve 22 is depicted, which relates to the presence of air bubbles in the fluid to be injected. This is detectable from the consideration that a maximum value is considerably lower even than the maximum value of the curve for injection into fluid 21.

FIG. 5 exhibits a curve 23, which can be detected on the basis of normal maximum pressure, but wherein there is no pressure drop after pressure from the pump 3 is released, to indicate blockage of a line or needle 6. If curve 23 is detected, pressure from pump 3 can be raised further at 24, as depicted in FIG. 6. Thereby, confirmation of the suspected blockage can be obtained and/or an attempt can be directed at opening line or needle 6 on the basis of the pressure increase at 24.

Pressure in line 5 from pump 3 may exhibit at the needles 6 a curve shape 25 as in FIG. 7, based on intermittent injection of separate eggs, all to the same injection depth. Therein different phases can be distinguished, like entering the egg, applying pressure, maintaining pressure, releasing pressure, withdrawing needle from egg, supplying new egg, et cetera.

The enlarged representation of curve 25 in FIG. 8 clarifies that a number of aspects can be monitored in embodiments according to the present disclosure, for instance:
bubbles were/are in line 5 or needle 6, at 26;
line 5 and/or needle 6 is fully blocked at 27 or partially blocked at 28;
injection is in tissue of for instance an embryo in an egg, at 25;
injection is in fluid for instance in an egg surrounding the embryo at 29; and
injection is in air, outside an egg or into the air pocket in the egg at 30; and
a pump defect can be detected if no pressure is built up at all, which is not individually shown, but in such a case, the pressure will not rise from the horizontal axis.

It is noted that in case the injection is detected to be performed in outside air, in the fifth of the cases mentioned directly above, there is evidently no egg at the location of a particular needle. For instance, in FIG. 1 or 2, one of the eggs 4 may kept away from the path of movement of that needle, for example because the one of the eggs 4 does not contain any embryo or a dead embryo, which can have been detected in a detection step, wherein the egg may be kindled or otherwise examined Subsequently, the support 15 can be held back from the needle 6, if the egg 4 is determined to be dead or missing an embryo, to avoid later contamination using the same needle 6 or superfluous injection in such an egg.

It should be noted that pump 3 can be deactivated during progress into the eggs in the test or calibration phase. The system does not monitor pressure of flow during movement for penetration of injection needle 6 into the egg. Pump 3 and monitoring are active only when the needle has advanced to one of a number of depths in the test or calibration phase, and are active in the subsequent operational phase only when the single determined injection depth is reached, and therefore also not during travel of the needle 6 to this depth, whereby a considerable amount of fluid to be injected can be saved. In particular if fluid to be injected is costly, such as medicines and/or antibiotics, this may result in a considerable benefit, in addition to the finding that it is possible to determine what object part is being injected from the profile of a pressure or flow curve.

After the above detailed description of particular embodiments of the present disclosure, it should be noted here that a scope of protection for these embodiments is however by no means to be interpreted as limited to any specific feature, element, component or aspect, and that equivalent or alternative configurations may as well comply with the present disclosure and fall within the scope of protection therefore, as defined in the appended claims, unless such equivalent or alternative configurations fundamentally deviate from the requirements according to the appended claims. For instance, the method or system could rely on the creation of an injection table in the phase of calibration. Allowing for deviations in needles 6 and/or supports 15 can result in individual drive of each needle relative to a corresponding egg. Likewise, deviations in outer dimensions of individual eggs can also result in individual drive is for separate needles in their injection movement. A main consideration is that a constant injection depth is determined in the calibration phase and thereafter maintained, regardless of such needle or support variations or differences in outer dimensions of individual eggs, where in the injection phase subsequent to the calibration phase the presence of air bubbles and for partial blockages of fluid lines and more in particular injection needles can be detected. During calibration, the object part reference may be determined, where after in subsequent injections in a production phase detected pressure or flow may be set out against the operational reference that would indicate air bubbles or partial or full blockage, or the like.

The configurations in FIGS. 1 and 2 are mainly described as relating to the calibration phase, but the same configurations are equally applicable in the subsequent injection phase, wherein large numbers of eggs are subsequently injected (which may include that fluid is to be extracted therefrom). Moreover, the calibration can be performed only once for all subsequent injections, and may be expected to yield a highly reliable object part reference about the desired or necessary injection depth. If a test group is sufficiently large, the resulting determined injection depth will be sufficiently accurate for all subsequent injections. Calibration may even be omitted entirely. From such examples it is abundantly clear that only the following claims impose limitations on the scope of protection for embodiments according to the present disclosure, to include equivalents and alternatives in as far as these are not excluded in or by the definitions according to the appended claims, and in particular the appended independent claims. Further, it is to be noted that the calibration described herein and defined in appended dependent claims 5-8 for calibration for determining a most preferred uniform injection depth for all needles during subsequent injections may be implemented independently from the steps and components for monitoring desired operation and the operational state of the system, and could be made subject of protection independent from such monitoring of the operational state of the system.

The invention claimed is:

1. An injection system configured to inject objects, such as eggs, with a fluid, wherein said objects each comprise at least two object parts, such embryo tissue, embryotic or allantoic fluid and an air pocket, of which at least one object part is to be injected, the system comprising:
a supply configured to provide objects;
needles connected with at least one drive configured for selective movement of the objects and the needles relative to one another,
a control configured to inject needles into the objects to a determined injection depth for injection of the objects, which depth is set to correspond with the at least one object part to be injected, and to advance the injection needles to the determined depth into the objects and injecting fluid into the objects at the determined injection depth;
at least one sensor configured to monitor pressure or flow of the fluid at least during injecting, and to generate a monitoring signal sent to the control; and
wherein the control is further configured to detect a defect in or of the system from a group of system defects comprising: air bubbles in fluid; blocked fluid lines; and blocked needles, based on the monitoring signal representing the monitored pressure or flow.

2. The system according to claim 1, wherein the control is configured to detect the operational state of the needles and/or of the fluid by comparing a monitored pressure or flow with an operational reference.

3. The system of claim 2, wherein the operational reference comprises an expected pressure or flow change in time during and/or after injecting the objects based on desired working conditions of the needle and/or connections thereto and in the fluid.

4. The system of claim 1, wherein at least one of the sensor and the control is configured to continue monitoring during a period after injecting the fluid.

5. The system of claim 1, wherein the injection depth, which is set to correspond with the at least one object part to be injected, is set through:
the control being configured to advance injection needles into objects of a test group using the drive and to stepwise advance the injection needles to at least two different depths in and injecting fluid at each of the two different depths into each of the at least one object of the test group;
wherein the control is further configured to select one of the at least two different injection depths as the determined injection depth at which the object part to be injected is arranged in the at least one object of the test group from a injection pressure or injection flow relative to an expected injection pressure of injection flow at injection of the fluid at each of the at least two different depths; and
wherein the needles and drives are connected with the control and are together with the control configured to inject all of a plurality of objects other than the objects in the test group to the determined injection depth of the object part to be injected of the at least one object of the test group.

6. The system of claim 1, wherein the expected injection pressure or injection flow comprises an object part reference of an expected pressure or flow change in time during and/or after injecting the objects based on injecting the fluid in distinct ones of the object parts of the objects.

7. The system of claim 1, wherein the test group comprises two or more objects, and the control is configured to determine the injection depth by determining the injection depth for most certain injection of the fluid into the object part to be injected for each or most of the two or more objects in the test group.

8. The system of claim 6, wherein the control is configured to determine the injection depth by distinguishing between injecting fluid into air, into fluid and into tissue based on the object part reference, and setting a depth at a one of the at least two different injection depths, at which the injection pressure or injection flow most closely approximates the object part reference corresponding with the object part to be injected, as the determined injection depth.

9. The system of claim 1, further comprising a plurality of pressure or flow sensors, wherein the control is configured to monitor the injection pressure or injection flow for each individual injection needle during injection of fluid simultaneously in a plurality of objects.

10. The system of claim 9, wherein the control is further configured to decide that an injection needle is at least partially blocked, if at or after injection of fluid into the objects, the injection pressure or flow drops slower than expected for the object part to be injected, and indicating at least one of replacing, unblocking or cleaning the injection needle when a difference between a monitored pressure or flow drop and an expected pressure or flow drop or between a monitored pressure or flow drop and the operational reference corresponding with the object part to be injected exceeds a predetermined threshold.

11. The system of claim 10, wherein the control is further configured to administer an additional fluid injection and monitor the injection pressure or injection flow for an injection needle suspected of blockage before deciding that the injection needle is blocked, if again thereafter injection pressure or flow drops slower than an expectation or the operational reference corresponding with the object part to be injected.

12. The system of claim 9, wherein the controller is configured to decide:
   that an object is absent if at injection of fluid into the objects the injection pressure or flow reduces more quickly than an expectation or operational reference corresponding with the object part to be injected, and/or
   an air bubble presence in the injection fluid if at injection of fluid into the objects the injection pressure or flow reaches a lower maximum than expected or than the operational reference corresponding with the object part to be injected.

* * * * *